(12) United States Patent
Goering et al.

(10) Patent No.: US 8,389,424 B2
(45) Date of Patent: Mar. 5, 2013

(54) REINFORCEMENT FOR DARTED PI PREFORMS

(75) Inventors: Jonathan Goering, York, ME (US); Michael McClain, Barnstead, NH (US)

(73) Assignee: Albany Engineered Composites, Inc., Rochester, NH (US)

( * ) Notice: Subject to any disclaimer, the term of this patent is extended or adjusted under 35 U.S.C. 154(b) by 597 days.

(21) Appl. No.: 12/616,597

(22) Filed: Nov. 11, 2009

(65) Prior Publication Data

US 2011/0111664 A1    May 12, 2011

(51) Int. Cl.
- B32B 7/00 (2006.01)
- D03D 13/00 (2006.01)
- D03D 11/00 (2006.01)
- D03D 1/00 (2006.01)

(52) U.S. Cl. ........ 442/203; 442/204; 442/205; 428/119; 428/120; 156/148

(58) Field of Classification Search ................. 428/36.1; 442/203–205; 139/348 R, 386, 387 R
See application file for complete search history.

(56) References Cited

U.S. PATENT DOCUMENTS

| | | |
|---|---|---|
| 4,256,790 A | 3/1981 | Lackman et al. |
| 4,331,495 A | 5/1982 | Lackman et al. |
| 5,429,853 A | 7/1995 | Darrieux |
| 6,103,337 A | 8/2000 | Burgess |
| 6,446,675 B1 | 9/2002 | Goering |
| 6,874,543 B2 | 4/2005 | Schmidt et al. |
| 2005/0042410 A1 | 2/2005 | Sakonjo et al. |
| 2009/0202763 A1 | 8/2009 | Rose et al. |

FOREIGN PATENT DOCUMENTS

| | | |
|---|---|---|
| DE | 1981666 A | 10/1999 |
| WO | WO 2005/082605 A | 9/2005 |
| WO | WO 2009/088029 A | 7/2009 |

OTHER PUBLICATIONS

International Search Report and Written Opinion issued for corresponding international application PCT/US2010/055845, prepared by the European Patent Office acting as the ISA and dated Feb. 17, 2011.*

* cited by examiner

*Primary Examiner* — Jenna Johnson
(74) *Attorney, Agent, or Firm* — Frommer Lawrence & Haug LLP; Ronald R. Santucci

(57) ABSTRACT

A reinforcement for a darted three-dimensional Pi or T-shaped preform, a method of making thereof and a composite structure including the reinforcement is disclosed. The reinforcement is a steered fabric having a width, a length, a first face surface and a second face surface separated by a thickness. The first face surface of the steered fabric is affixed to a darted component of the preform. The steered fabric reinforcement can be a single layer or multilayer fabric, which can be woven using a programmable take up system.

27 Claims, 5 Drawing Sheets

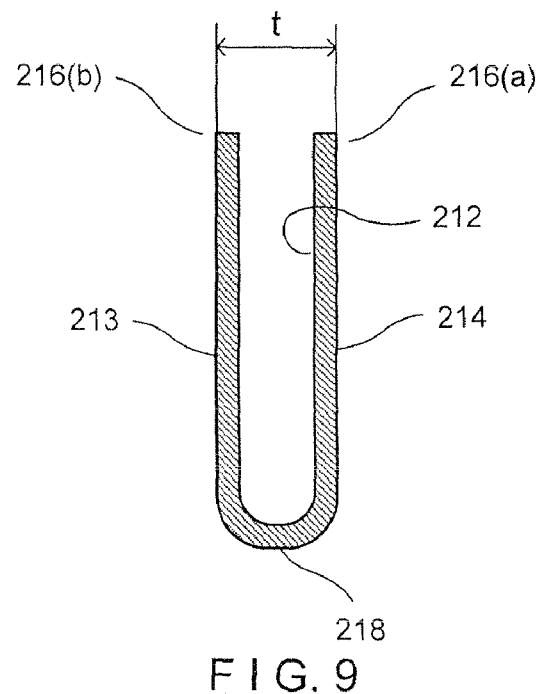
F I G. 9
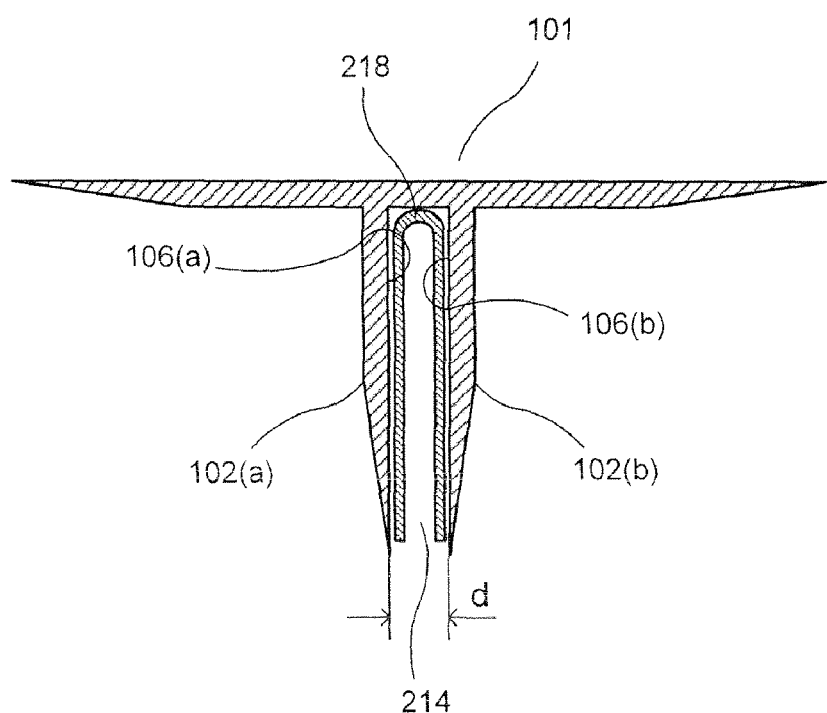
F I G. 10

REINFORCEMENT FOR DARTED PI PREFORMS

INCORPORATION BY REFERENCE

All patents, patent applications, documents, references, manufacturer's instructions, descriptions, product specifications, and product sheets for any products mentioned herein are incorporated herein by reference, and may be employed in the practice of the invention.

FIELD OF THE INVENTION

This invention generally relates to woven preforms and particularly relates to woven preforms used in reinforced composite materials. More particularly, the present invention relates to darted Pi-shaped preforms that can be shaped into highly curved shapes. Even more particularly, the present invention relates to reinforcements for darted Pi-shaped preforms.

BACKGROUND OF THE INVENTION

The use of reinforced composite materials to produce structural components is now widespread, particularly in applications where their desirable characteristics of light weight, high strength, toughness, thermal resistance, and ability to being formed and shaped can be used to great advantage. Such components are used, for example, in aeronautical, aerospace, satellite, high performance recreational products, and other applications.

Typically, such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure.

Through the use of such reinforcement materials, which ultimately become a constituent element of the completed component, the desirable characteristics of the reinforcement materials, such as very high strength, are imparted to the completed composite component. The typical constituent reinforcement materials may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal, or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform. Any break or discontinuity in the reinforcement preform limit the ability of the preform to transfer and bear the stress applied to the finished component.

Frequently, it is desired to produce components in configurations that are other than such simple geometric shapes as, for example, plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain".

An example of an intersecting configuration is set forth in U.S. Pat. No. 6,103,337, the disclosure of which is incorporated herein by reference. This reference sets forth an effective means of joining together two reinforcing plates into a T-form. This can be accomplished by joining a first reinforcing panel to a second reinforcing panel placed on edge against the first panel.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface (s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the joint is that of the adhesive and not that of the matrix or the reinforcement materials.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its method divisional counterpart, U.S. Pat. No. 4,256,790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been cured simultaneously or "co-cured." Another method to improve upon junction strength is set forth in U.S. Pat. No. 5,429,853.

While the prior art has sought to improve upon the structural integrity of the reinforced composite and has achieved success, particularly in the case of U.S. Pat. No. 6,103,337, a desire exists to improve thereon or address the problem through an approach different from the use of adhesives or mechanical coupling. In this regard, one approach might be to create a woven three dimensional ("3D") structure by specialized machines. However, the expense involved is considerable and rarely is it desirable to have a weaving machine directed to creating a single structure. Despite this fact, 3D preforms which can be processed into fiber reinforced composite components are desirable because they provide increased strength and damage tolerance relative to conventional two dimensional ("2D") laminated composites. These preforms are particularly useful in applications that require the composite to carry out-of-plane loads. However, the prior-art preforms discussed above have been limited in their ability to withstand high out-of-plane loads, to be woven in an automated loom process, and to provide for varying thickness of portions of the preform.

Another approach would be to weave a flat, multilayer structure and fold it into 3D shape. Early attempts at folding multilayer preforms into 3D shapes typically resulted in parts that distort when the preform was folded. The distortion occurs because the lengths of fiber as-woven are different than what they should be when the preform is folded. This causes dimples and ripples in areas where the as-woven fiber lengths are too short, and buckles in the areas where fiber lengths are too long. An example of a 3D preform weave architecture, which may lead to ripples or loops in areas where the preform is folded, is disclosed in U.S. Pat. No. 6,874,543, the entire content of which is incorporated herein by reference.

One approach to solve the problem of distortion upon folding is disclosed in U.S. Pat. No. 6,446,675, the entire content of which is incorporated herein by reference. This reference provides for a flat, multilayer structure that can be folded into a T-shaped, or Pi-shaped, 3D structure, so called because the folded portion of the preform may produce either one or two legs (for T- and Pi-shapes, respectively) generally perpendicular to a flange or parent material. This is accomplished by adjusting the length of fibers during weaving to prevent the above mentioned dimples and buckles at the site of the fold. In the weaving process, some fibers are woven too long, and others woven too short, in the region of the fold. The short and long fibers are then equalized in length as the preform is folded, yielding a smooth transition at the fold.

The benefit of folded preforms is the strength of the joint between the panel to be reinforced and the reinforcing panel. As they are woven together, the panels share reinforcing material and matrix material, creating a unitary construction. The juncture between the integrally woven reinforcement panel or leg and the parent material or flange is no longer the weak link, relying solely upon the strength of the adhesive for the strength of the joint, as in the prior art reinforcements. Instead, the fibers of the preform integrally weave the legs and the flange together.

Frequently, however, complex shapes, such as curves, require reinforcement. Folded T- or Pi-shaped reinforcements require darting of the legs in order to accommodate a curved surface. As the flange material of a folded preform assumes a curved shape, the length of the curved surface necessarily varies from the inside of the curvature to the outside. The arc length of the outside of the curvature, the surface with the larger radius when curved, increases, while on the inside of the curvature, the arc length decreases. The legs of typical folded preforms cannot change length as required to accommodate a curved surface. To accommodate a curved surface, the legs must be darted, that is, cut to allow the leg to conform to the changed arc length.

Typically, the cut is along the localized radius of curvature, but other, non-radial cuts may also be used to accommodate the change in length. To allow for the decreased length on the inside of a curved preform, the leg is cut and the cut edges allowed to overlap, or the excess material is removed. Similarly, to accommodate the increased length on the outside of the curvature, the leg is cut, resulting in a triangular gap between cut edges of the leg. In either configuration, the darting breaks the continuity of the reinforcing material in each leg. Darting the legs of a 3D T- or Pi-preform can seriously degrade the load carrying capabilities of the preform, because darting involved cutting the fibers that provide the primary load path around the corner. Prior art methods have not adequately addressed the need for adequate reinforcement of darted preforms used to reinforce curved surfaces.

The present invention addresses the shortcomings of the prior art by providing a reinforcement for 3D preforms, particularly darted 3D preforms.

SUMMARY OF THE INVENTION

It is therefore an objective of the invention to provide a reinforcement for a 3D preform.

It is another objective of the invention to provide a reinforcement for a T- or Pi-shaped 3D preform.

It is yet another objective of the invention to provide a woven, steered fabric reinforcement for a darted preform.

It is yet another objective of the invention to provide a woven, steered fabric configured to occupy the clevis between the legs of a 3D Pi preform as a reinforcement.

For a better understanding of the invention, its operating advantages and specific objects attained by its uses, reference is made to the accompanying descriptive matter in which preferred, but non-limiting, embodiments of the invention are illustrated.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The accompanying drawings, which are included to provide a further understanding of the invention, are incorporated in and constitute part of this specification. The drawings presented herein illustrate different embodiments of the invention, and, together with the description, serve to explain the principles of the invention. In the drawings:

FIG. 9 is a sectional end view of a steered fabric reinforcement according to one embodiment of the present invention; and FIG. 10 is the 3D preform of FIG. 2 with the steered fabric reinforcement of FIG. 9 placed between the legs of the preform, according to one embodiment of the present invention.

DETAILED DESCRIPTION OF THE PREFERRED EMBODIMENTS

Figure 1:
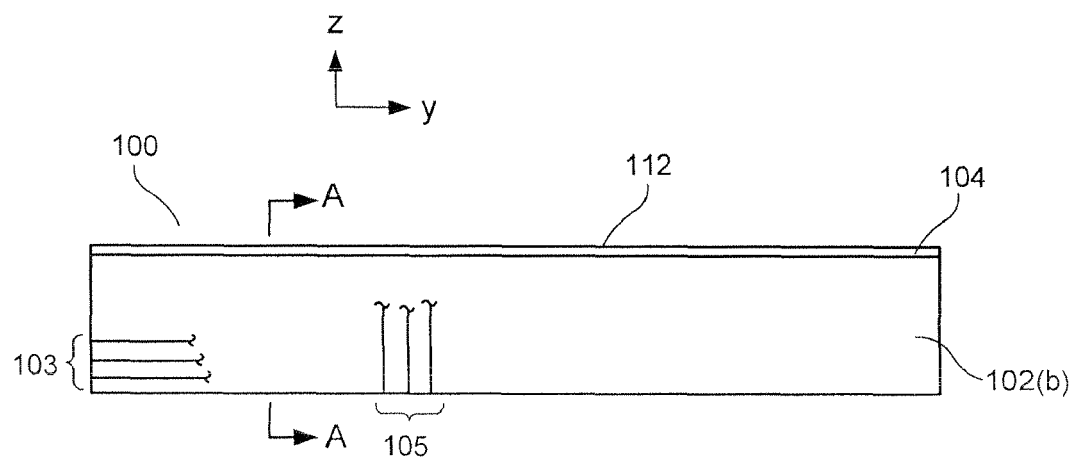
FIG. 1 is a side view of a conventional 3D Pi preform.
Figure 2:
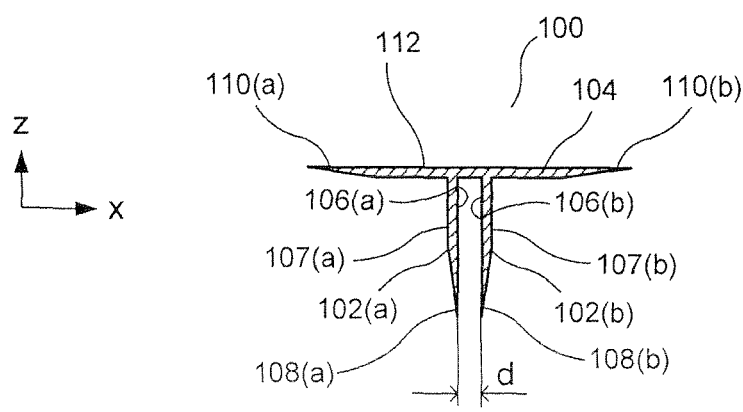
FIG. 2 is a cross sectional view of the conventional 3D preform of FIG. 1 taken along line A-A.

FIGS. 1 and 2 illustrate a 3D Pi preform 100, with integrally woven dependent legs 102(*a*) and 102(*b*) (collectively, "legs 102"). The preform is formed from a flat multilayer woven structure appropriately woven and folded to produce legs 102(*a*) and 102(*b*) extending from flange 104. It would be apparent to a person of ordinary skill in the art that other cross sectional shapes are possible from folded preforms. For instance, a T-shape can be formed from a flat woven preform if only one leg 102 is formed. Similarly a T-shape would also result from a Pi preform with no space d separating the legs 102, as if, for example, inside facing surfaces 106(*a*) and 106(*b*) were in an abutting arrangement.

For purposes of this disclosure, "fiber" is meant in a broad sense and encompasses fibers, yarns, or braids. While carbon fiber is preferred, the invention is applicable to practically any other fiber including but not limited to those that can be stretch broken, e.g. stretch broken carbon fiber or glass.

For clarity, an arbitrarily chosen coordinate system is provided in FIGS. 1-4 to illustrate the orientation of the various views in space. This is provided as an aid to understanding the figures and is in no way a part of the disclosure of the invention. In the coordinate system used in the figures, the weft or fill (F) fibers or yarns are aligned with the X-axis and the warp (W) fibers or yarns are aligned with the Y-axis. The Z-axis is perpendicular to the planar flange 104.

The preform 100 is assembled from warp (W) fibers or yarns 103 and weft (F) fibers or yarns 105 as shown in FIG. 1. In some embodiments individual warp (W) and weft (F) fibers 103 and 105 interweave with each other in any known pattern to form a woven preform. Through known weaving methods, warp (W) fibers 103 and weft (F) fibers 105 are woven in the flange 104 and the legs 102 with the warp (W) fibers 103 running continuously in the Y-direction in both the flange 104 and the legs 102. Weft (F) fibers 105 run in the X-direction in the unfolded preform. When the legs are folded to form a 3D preform, the weft (F) fibers 105 in the legs 102 are oriented in the Z-direction.

As illustrated in FIG. 2, legs 102 have free ends 108(*a*) and 108(*b*) located away from flanges 104. Collectively, free ends 108 may be tapered as illustrated in FIG. 2. Other free end configurations are anticipated depending on design criteria or other considerations. Non-limiting examples of such free end configurations may include square, rounded, or bulbous cross sections. Adjacent legs 102 may have the same end configuration or may have different end configurations. End configurations may vary along the length of the preform as required.

Similarly, flange 104 comprises end portions 110(*a*) and 110(*b*) (collectively, end portions 110) located at the ends of the flange 104. As illustrated, end portions 110 are shown to be tapered. As with the free ends 108 above, the flange end portions may have configurations other than shown tapered configuration. As alternate, non-limiting examples, end portions 110 may be square, round, or bulbous, or combinations thereof. It should be noted that both, legs 102 and either sides of flange 104, may have equal or unequal lengths. For example, leg 102(*a*) may be longer than leg 102(*b*), or vice versa. Similarly, one side of flange 104 may be wider than the other side.

Figure 4:
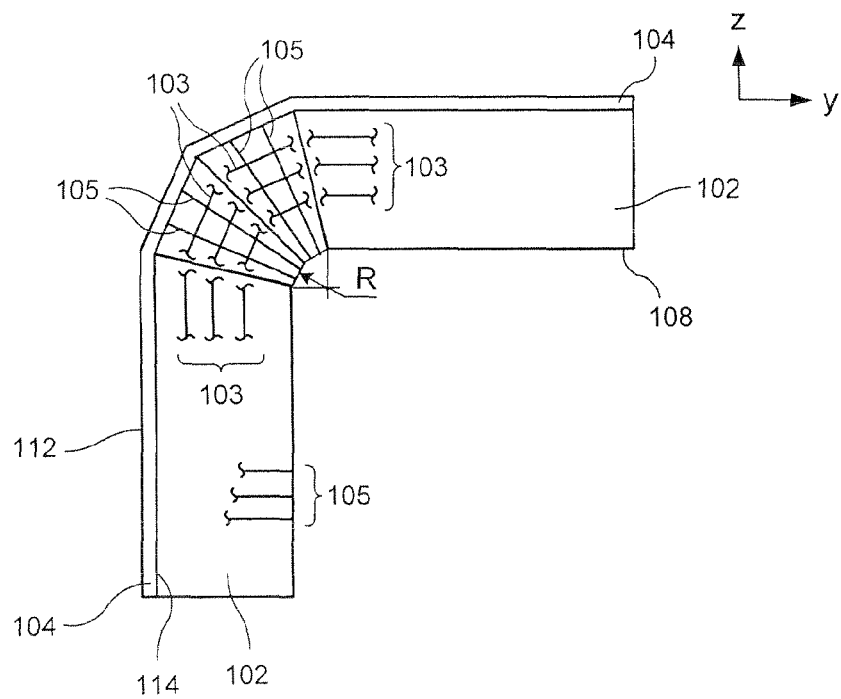
FIG. 4 is a side view of a conventional 3D darted preform configured in a bent or curved configuration.

The 3D preform 100 of FIG. 1 is shown in a straight configuration in which the top surface 112 of the flange is generally planar in the X and Y directions. Such configurations may be useful in applications in which a flat panel is required. However, in many applications it may be desirable to have a curved preform to create a curved or curvilinear 3D panel. FIG. 4 is one exemplary, non-limiting example of a curvilinear panel useful in some applications. As shown, flange 104 remains flat, or nearly flat, in the direction of the X-axis, or weft (F) direction. The configuration illustrated shows the Y-axis fibers, the warp (W) fibers 103, configured in an approximately 90° bend or curve. As such, the warp (W) fibers 103, initially aligned with the Y-direction, change orientation through the bend to become aligned with the Z-axis.

Figure 3:
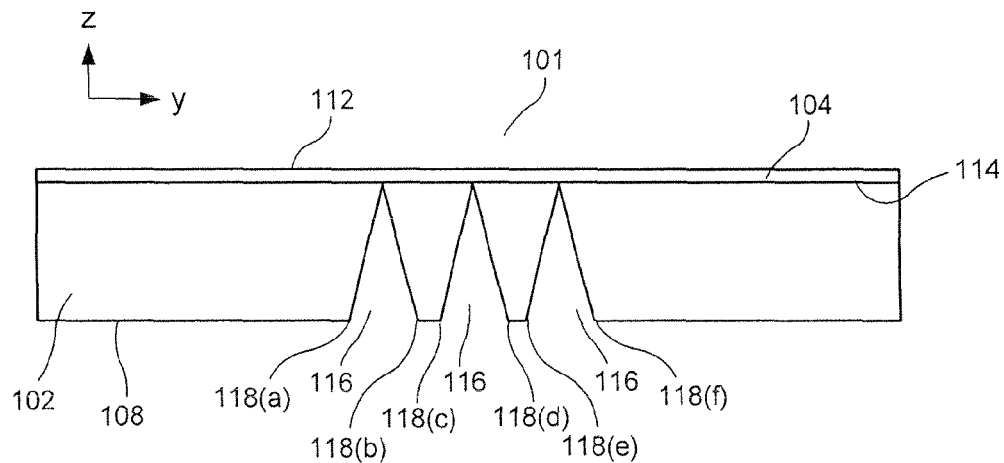
FIG. 3 is a side view of a conventional 3D darted preform.

FIG. 3 illustrates a conventional 3D darted preform 101 prior to bending, as is known in the art. Darts 116 are generally cuts in the legs 102 extending from the free end 108 and terminating at the underside 114 of flange 104. Darts may be formed by cutting triangular sections from each leg to be darted, as shown in FIG. 3. A first side of the triangular piece removed from the leg 102 is aligned with the free end 108 of the leg. The two additional sides of the dart 116 extend from each end of the first side of the triangle towards, and converging at, the underside 114 of the flange 104.

Alternately, the darts may be single cuts extending from the free end 108 of a leg 102 towards, and terminating at, the underside 114 of the flange 104.

When darted preform 101 (FIG. 3) with triangular darts is bent into the configuration as shown in FIG. 4, the corners of a removed triangular section, for example 118(*a*) and 118(*b*), are brought together, allowing the flange 104 of the preform to assume a curved shape. Pairs of adjacent corners, for example 118*a*/118*b*, 118*c*/118*d*, 118*e*/118*f* (FIG. 3), may come together in the same plane, maintaining smooth inner surfaces (106(*a*) and 106(*b*)) and outer surfaces (107(*a*) and 107(*b*)), of the legs 102 as shown in FIG. 2. In some applications, smooth, planar surfaces of the legs 102 are not required. In those applications, single cuts darts may be used, and the cut edges can overlap as the preform is bent. Multiple darts of either type can be used as is required by the application.

Regardless of the number or type of darts used, the effect on the preform is generally the same. Any cut on the leg 102 extending from the free end 108 toward the underside 114 of flange 104 will cut all of the warp (W) fibers 103 of the leg 102 along the length of the cut. Because the warp (W) fibers 103 provide the primary load carrying path around the corner of the bent preform 101, cutting the warp (W) fibers 103 interrupts the load path and can seriously degrade the ability of the structure to carry loads.

Cuts which are non-parallel to weft (F) fibers 105 of the leg 102 are likely to cut one or more weft (F) fibers 105. As is generally understood, any cut to the reinforcing fibers or yarns in the legs 102 provides a break in the continuity of the reinforcement and decreases the effectiveness of the reinforcement. In particular, breaks in the warp (W) fibers 103 significantly diminish the strength of the preform.

In the bent darted preform 101 illustrated in FIG. 4, the preform was bent such that the legs 102 are on the inside of the radius of curvature R, that is concave on the leg side. In some instances, it is desirable to provide a preform curved such that the legs are on the outside of the curvature of the darted preform (not shown). Similar darting is used to form a bend in which the 3D preform is convex on the leg side. When the leg is on the outside of the radius of curvature, straight cuts are typically used. As is generally known, when the preform is bent, the dart opens up and triangular spaces are formed from the straight cuts.

In many applications, it is desirable to fabricate a preform of complex curvature such that the preform has both concave and convex curvatures along its length. In such applications, the preform would be, in some areas along the length, concave on the leg side, or convex on the leg side. Accordingly, the legs 102 would be, in some areas, on the inside of the curvature (for example, as shown in FIG. 4), and in other areas, on the outside of the curvature.

Regardless of the direction of the curvature, or if there is bend at all, any interruption or break in the continuity of the warp (W) or weft (F) reinforcing fibers 103 and 105 in the legs 102 weakens the preform because the preform gains much of it strength from the continuity of the reinforcing fibers, particularly those fibers in the warp (W) direction. Impregnating a preform with cut or interrupted warp (W) reinforcing fibers 103 with a matrix material provides little improvement to the strength because the strength of the preform significantly relies then on the strength of the matrix material.

Figure 5:
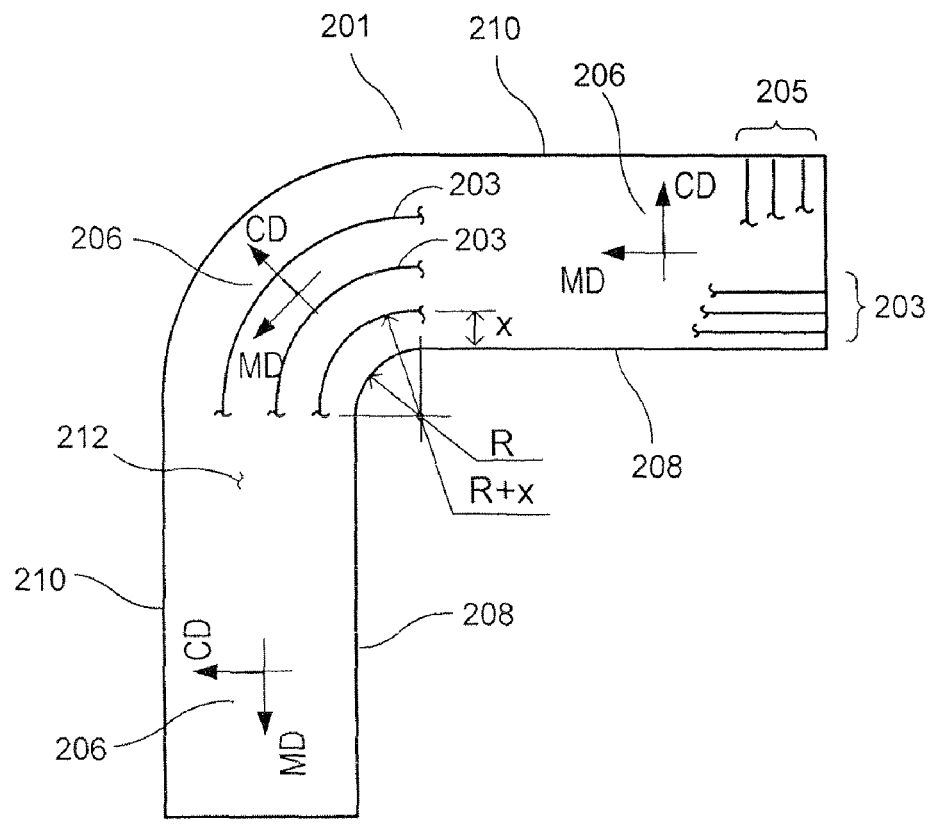
FIG. 5 is a side view of a steered fabric reinforcement, according to one embodiment of the present invention.

In order to reinforce a darted preform 101, a steered fabric 201, as shown in FIG. 5, is provided which can be affixed to one or both legs 102 of the darted 101 preform, and the modified preform can be impregnated with a resin. As would be obvious to one of ordinary skill in the art, the same, or similar steered fabric 201 could be affixed to a non-darted preform to increase the strength, stiffness, or other reinforcing characteristics of the preform.

Figure 6:
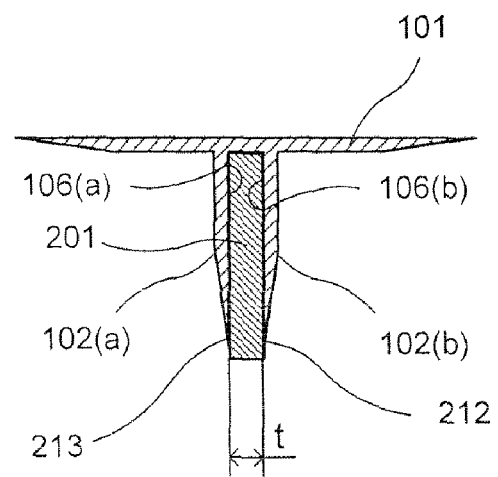
FIG. 6 is the 3D preform of FIG. 2 with the steered fabric reinforcement of FIG. 5 placed between the legs of the preform, according to one embodiment of the present invention.

Steered fabric 201 may be woven flat and comprised of warp (W) fibers or yarns 203 and weft (F) fibers or yarns 205 which may be oriented essentially perpendicular to each other throughout the fabric as shown in FIG. 5. Generally flat surfaces 212, 213 of the fabric are spaced apart, defining the thickness, t, of the fabric 201 as shown in FIG. 6. Thickness t may also be achieved by combining two or more steered fabrics together or may be achieved by weaving a single multilayer steered fabric or may be achieved by weaving a flat steered fabric and folding it along the length of the fabric. In any case, thickness, t, of the steered fabric 210 should be no greater than d (FIG. 2), the spacing between legs 102 (a) and 102 (b), sometimes referred to as the clevis. FIG. 5 includes orthogonal coordinates 206 in three locations on the steered fabric 201 indicating the orientation of the localized warp (W) fibers 203 and weft (F) fibers 205 with respect to each other and to the fabric 201 itself. Advantageously, warp (W) fibers 203 are continuous around the bend, as illustrated in FIG. 5.

In some applications it may be desirable to provide a steered fabric with a thickness, t, less than the clevis width, or spacing, d, between the legs 102 of a Pi preform, so as to leave some space between the legs unfilled with fabric. For example, it may be beneficial to place other materials, components, or parts within the clevis in addition to the steered fabric. The other material, components, or parts may add functionality to the preform, or add mechanical or physical characteristics not easily achieved with fabrics or preforms.

FIG. 9 represents a cross sectional view of an alternate steered fabric 214 in accordance with this invention. Rather than fill the clevis between legs 102(a) and 102(b) with a flat steered fabric 201 as in FIG. 6, the steered fabric 214 is first woven flat and then folded along the length in to a generally U-shaped configuration prior to insertion between legs 102. In a U-shaped configuration, portions of generally flat surface 212 are folded towards each other such that portions of the surface are generally parallel to each other as shown in FIG. 9. FIG. 10 illustrates a steered fabric folded into a U-shape and inserted in a clevis of width d. In an embodiment (not shown), steered fabric 214 is woven flat and folded such that portions of generally flat surface 212 (or 213) form an inclined angle of between 0° and 180°.

The folded steered fabric 214 may fill, or substantially fill, the clevis. Alternately, the folded steered fabric 214 may not fill the clevis, leaving a space between the folded legs 216(a) and 216(b) as illustrated in FIGS. 9 and 10. In some instances, it may be desirable to leave a space between one of the folded steered fabric 214 legs 216(a) or 216(b) and the inside surface of the legs 102(a) or 102(b).

For ease of illustration, FIG. 10 shows folded steered fabric 214 with the closed end 218 adjacent to the closed end of the clevis. It is recognized that folded steered fabric 214 may be placed in the clevis in an orientation rotated 180° from that shown. In doing so, the clevis will appear to be filled or substantially filled with the fabric 214, but may maintain an open core.

The steered fabric 201 has a length measured in the direction of the warp (W) fibers and a width measured in the direction of the weft (F) fibers. Generally, when affixed to the legs 102 of the darted preform 101, the length of the steered fabric 201 is aligned with the length of the darted preform 101, as measured in the warp (W) direction. In a bent or curved configuration, the length will be a linear measurement but will include arc lengths in the curved areas. The width of the steered fabric 201, measured in the weft (F) direction, may conform to the length of the legs 102 to be reinforced. In some instances, the width of the fabric 201 may be less than, or greater than, the length of the legs to be reinforced.

As illustrated, steered fabric 201 is provided with one essentially 90° bend to conform to the darted and bent preform 101 in FIG. 4. The steered fabric 201 has an inner edge 208 and an outer edge 210. As illustrated, outer edge 210 is shaped to conform to the radius formed by the underside 114 of the flange 104 of the bent preform 101. Similarly, inner edge 208 is shaped to conform to the free end 108 of legs 102, including the inner radius of curvature R of the bent preform 101 of FIG. 4.

Bent preform 101 and steered fabric 201 are shown with only one bent or curved section, bent at approximately 90°, for simplicity of illustration only. As discussed above, the preform may be bent either concave or convex on the leg side, or any combination of concave and convex, along the length of the bent preform 100. The bent preform 101 may be comprised of bends greater or less than the 90° shown. The steered fabric 201 may be woven to match the curvature of the bent preform 101 to which the fabric is to be affixed.

The steered fabric 201 is created by weaving the fibers shorter on the inner edge 208 in the area of a curve and weaving subsequent fibers progressively longer towards the outer edge 210 of the fabric 201 in the localized area of the curve or bend. For example, the innermost warp (W) fiber 203 at the inner radius R of the steered fabric 201 has a length equal to the arc length of the radius R over the angular measure of the bend or curve. A subsequent fiber, offset a distance x from the innermost fiber towards the outer radius of curvature, would have a length equal to the arc length of (R+x) over the same angular measure of the bend or curve. Areas in which there is no curve, fibers along the inner edge and outer edge would be of the same length.

Folded steered fabric 214 may be made in a similar fashion with warp (W) fibers or yarns woven shorter at the inner edge 208 of the curvature as shown in FIG. 5 and progressively longer approaching the outer edge 210 of the curve.

Steered fabric may be fabricated on weaving equipment, comprising, for example, a programmable take up system that can provide different amounts of take up at each edge of the fabric. The programmable take up system can produce fabric having arbitrary combinations of curved and straight sections which can approximate essentially any curved configuration.

For simplicity, reinforcing a Pi preform having 2 legs will be discussed here, recognizing that the same steered fabric 201 and method can be used to reinforce a T preform, having one leg, or a preform having more than 2 legs. After weaving the steered fabric 201 to conform to the bent preform 101, the fabric 201 is affixed to the preform. For darted and bent preforms 101 with at least 2 legs 102, the steered fabric may be affixed to one or both legs 102. In some instances, it may be desirable to affix the steered fabric 201 between a pair of adjacent legs 102. In such a configuration, the space between the legs is commonly known as the clevis. Use of a steered fabric in such a configuration is illustrated in FIG. 6.

FIG. 6 is a cross sectional view of a Pi shaped preform, similar to that in FIG. 2, with a steered fabric 201 placed between adjacent legs 102(a) and 102(b), with generally flat surfaces 212, 213 abutting at least one of the inside surfaces 106(a) and 106(b). The steered fabric thickness may be equivalent to the spacing between the inner surfaces 106(a) and 106(b) of the legs 102. Thus placed between the legs 102, steered fabric 201 may be affixed to one or both legs, by such means as are known in the art. For example, steered fabric 201 may be attached to one or both legs 102 by sewing, stitching, stapling, adhesive, impregnate, or any other method known to the art.

Figure 7:
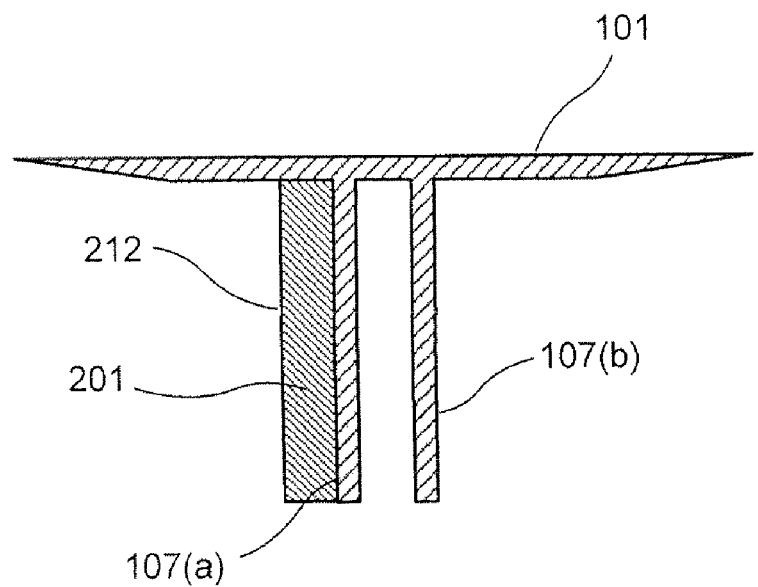
FIG. 7 is the 3D preform of FIG. 2 including a steered fabric reinforcement, according to one embodiment of the present invention.

Alternately, a steered fabric may be affixed to one or more of the outer surfaces 107(a) and 107(b) of the darted preform 101 as shown in FIG. 7. Methods similar to those discussed above may be used to affix the steered fabric 201 to the outer surface 107 of a leg 102.

Figure 8:
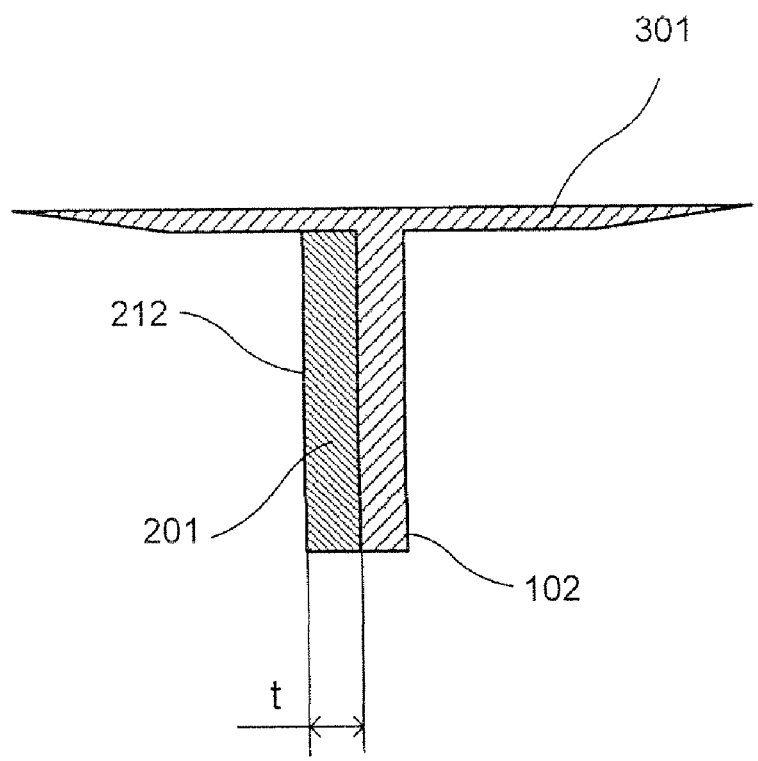
FIG. 8 is a sectional view of a T-shaped preform including a steered fabric reinforcement, according to one embodiment of the present invention.

Similarly, a steered fabric 201 can be used to reinforce a T-shaped preform by affixing the fabric 201 to one or both sides of the leg of the preform. As shown in FIG. 8, steered fabric 201 is affixed to a T-shaped preform 301 on one side of the preform's leg 102. The steered fabric may be affixed through any means known to the art.

Advantageous in some applications, a darted Pi preform 101, reinforced with steered fabric 201 located between adjacent legs 102(a) and 102(b) provides a smoother, more uniform outer surface 107 when compared with a darted preform with a steered fabric reinforcement on the outside of a leg of the preform Once reinforced with one or more steered fabrics 201, and the steered fabric 201 is appropriately affixed to the darted and bent preform 101, the preform 101 and the steered fabric 201 may be impregnated with a matrix material (e.g. a resin) as a single structure as is known in the art. The matrix material may be any of a wide variety of materials, such as epoxy, bismaleimide, polyester, vinyl-ester, ceramic, carbon and/or other materials, which exhibit desired physical, thermal, chemical, and/or other properties. Subsequent curing steps may be performed on the now reinforced preform to produce a finished reinforced composite structure. As is known in the art, upon impregnation, the matrix material encases the reinforcing warp (W) and weft (F) fibers 203 and 205 and fills the interstitial areas between the fibers. Once cured, the solidified matrix material forms a very strong bond with the fibers 103, 105, 203, 205 of the reinforced darted preform, resulting in a three-dimensional composite structure including the Pi or T-shaped preform, the steered fabric reinforcement, and the matrix material that at least partially impregnates the preform and the steered fabric reinforcement. As a result, stress on the finished component may be effectively transferred to and borne by the fibers 103, 105, 203, 205. Of particular note is the load path in the area of the darted and bent preform 101. Because the warp (W) fibers in the legs 102 are cut in the darting process, the primary load carrying path has been compromised. Affixing the steered fabric 201 to the legs 102, and subsequent impregnation and curing of the matrix material, provides a new and mechanically improved load carrying path. The load typically carried by the leg 102 of the preform can be sheared into the steered fabric 201 in the area of the bend or curve, effectively bypassing the darted areas of the preform. Accordingly, the load carrying capability has been restored and improved in the area of the curve.

The advantages of the present invention include providing a reinforcement for a 3D preform. In particular, the present invention provides reinforcement to the leg or legs of a 3D preform when the leg or legs have been darted to allow the preform to assume a curved configuration. The reinforcement is provided by a steered fabric woven in the same curved pattern as the 3D preform and possessing continuous fibers at least through the curved portion of the preform.

The steered fabric reinforcement can be woven from fibers or yarns made from materials such as glass, carbon, ceramic, aramid (e.g., "KEVLAR"), polyethylene, and/or other materials which exhibit desired physical, thermal, chemical and/or other properties.

Although preferred embodiments of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:
1. A reinforcement comprising:
a three-dimensional Pi or T-shaped preform having at least one darted component; and
a steered fabric having a width, a length, a first face surface and a second face surface separated by a thickness,
wherein the first face surface of the steered fabric is affixed to the darted component of the preform.
2. The reinforcement according to claim 1, wherein the steered fabric is woven.

3. The reinforcement according to claim 1, wherein the steered fabric is woven using a programmable take up system.

4. The reinforcement according to claim 1, wherein the preform is Pi-shaped preform having first and second face surfaces generally parallel to each other at least one of the first and second surfaces being the darted component.

5. The reinforcement according to claim 4, wherein the first and second face surfaces are planar.

6. The reinforcement according to claim 1, wherein the length of the steered fabric is aligned with a warp direction of the darted preform.

7. The reinforcement according to claim 1, wherein the steered fabric is woven from fibers or yarns made from a material selected from the group consisting of glass, carbon, ceramic, aramid, and polyethylene.

8. The reinforced darted preform according to claim 1, wherein the steered fabric and the darted component are simultaneously infused with a matrix material.

9. The reinforced darted preform of claim 8, wherein the matrix material is cured.

10. The reinforced darted preform of claim 8, wherein the matrix material is selected from the group consisting of epoxy, bismaleimide, polyester, vinyl-ester, ceramic, and carbon.

11. The reinforcement of claim 1 wherein the steered fabric is folded along the length.

12. The reinforcement according to claim 11 such that a first portion of the second face surface and a second portion of the second face surface form an inclined angle of between 0° and 180°.

13. The reinforcement according to claim 11 such that a first portion of the second face surface is substantially parallel to a second portion of the second face surface.

14. The reinforcement of claim 1, wherein when the Pi or T-shaped preform includes a bend, then the steered fabric includes shorter fibers on an inner edge in the area of the bend in the Pi or T-shaped preform and progressively longer fibers towards the outer edge of the bend in the Pi or T-shaped preform.

15. The reinforcement of claim 1 wherein the steered fabric is formed into a U-shape and disposed in the clevis of the Pi-shaped preform.

16. A method for reinforcing a three-dimensional Pi or T-shaped preform comprising the steps of:
 darting the three-dimensional Pi or T-shaped preform;
 forming a steered fabric reinforcement configured to the darted preform; and
 affixing the steered fabric reinforcement to the darted preform in at least the darted region.

17. The method of claim 16, wherein the steered fabric reinforcement is woven using a programmable take up system.

18. The method of claim 16, further comprising the step of impregnating the darted preform and the steered fabric reinforcement simultaneously with a matrix material.

19. The method of claim 18, wherein the matrix material is selected from the group consisting of epoxy, bismaleimide, polyester, vinyl-ester, ceramic, and carbon.

20. The method of claim 18, further comprising the step of curing the matrix material.

21. The method of claim 16, wherein the steered fabric reinforcement is woven from fibers or yarns made from a material selected from the group consisting of glass, carbon, ceramic, aramid, and polyethylene.

22. The method according to claim 16 such further comprising the step of folding the steered fabric along a length prior to affixing the steered fabric to the darted preform.

23. A three-dimensional composite structure comprising:
 a Pi or T-shaped preform having at least one darted component;
 a steered fabric having a width, a length, a first face surface and a second face surface separated by a thickness, wherein the first face surface of the steered fabric is affixed to the darted component of the preform; and
 a matrix material at least partially impregnating the preform and the steered fabric reinforcement.

24. The composite structure according to claim 23, wherein the steered fabric is woven using a programmable take up system.

25. The composite structure according to claim 23, wherein the matrix material is selected from the group consisting of epoxy, bismaleimide, polyester, vinyl-ester, ceramic, and carbon.

26. The three-dimensional structure according to claim 23 wherein the steered fabric is folded along the length such that a first portion of the second face surface and a second portion of the second face surface form an inclined angle of between 0° and 180°.

27. The reinforcement of claim 23 wherein the steered fabric is formed into a U-shape and disposed in the clevis of the Pi-shaped preform.

* * * * *